US012561443B1

(12) United States Patent
Meyer et al.

(10) Patent No.: US 12,561,443 B1
(45) Date of Patent: Feb. 24, 2026

(54) MACHINE LEARNING NETWORK SECURITY TESTING SYSTEM

(71) Applicant: UIPCO, LLC, San Antonio, TX (US)

(72) Inventors: Gregory Brian Meyer, San Antonio, TX (US); Arthur Quentin Smith, Fredericksburg, TX (US); Mark Paxman Warnick, San Antonio, TX (US); Ruthie Lyle, Durham, NC (US); Pooja Krishnaswamy, McKinney, TX (US); Elena Marie Carrasco, Converse, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 227 days.

(21) Appl. No.: 18/059,773

(22) Filed: Nov. 29, 2022

Related U.S. Application Data

(60) Provisional application No. 63/284,401, filed on Nov. 30, 2021.

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS

| | | | | |
|---|---|---|---|---|
| 11,956,255 B1 * | 4/2024 | Holub | ................... | G06N 20/00 |
| 2016/0248800 A1 * | 8/2016 | Ng | ........................ | G06Q 40/06 |
| 2019/0392140 A1 * | 12/2019 | Kawakita | ............... | G06N 3/045 |
| 2020/0045073 A1 * | 2/2020 | Ekambaram | .......... | G06F 21/577 |
| 2021/0037040 A1 * | 2/2021 | Aleks | ................. | H04L 63/1433 |
| 2021/0319098 A1 * | 10/2021 | Pogorelik | .............. | G06N 3/045 |
| 2023/0038196 A1 * | 2/2023 | Labreche | ............. | G06F 21/577 |
| 2023/0039079 A1 * | 2/2023 | Philip | ................... | G06F 21/577 |

* cited by examiner

*Primary Examiner* — Catherine Thiaw
*Assistant Examiner* — Daniel Elahian
(74) *Attorney, Agent, or Firm* — Plumsea Law Group, LLC

(57) ABSTRACT

A system and method for training a security model in a testing system using machine learning is disclosed. For example, the method includes accessing information about security attacks from at least one security attack information source, recognizing types of security attacks being attempted using natural language processing to process the information about security attacks, attempting at least one of the recognized types of security attacks on a network, identifying at least one security vulnerability based on results of the attempting, training the security model based on the identified at least one security vulnerability using machine learning, providing the trained security model to a user of the network, and blocking a security attack using the trained security model.

20 Claims, 10 Drawing Sheets

710

IDENTIFY RELEVANT DOCUMENTS — 810

IDENTIFY RELEVANT PORTIONS OF DOCUMENTS — 820

IDENTIFY ATTACK ALGORITHMS — 830

TRANSFORM ALGORITHMS INTO CODE — 840

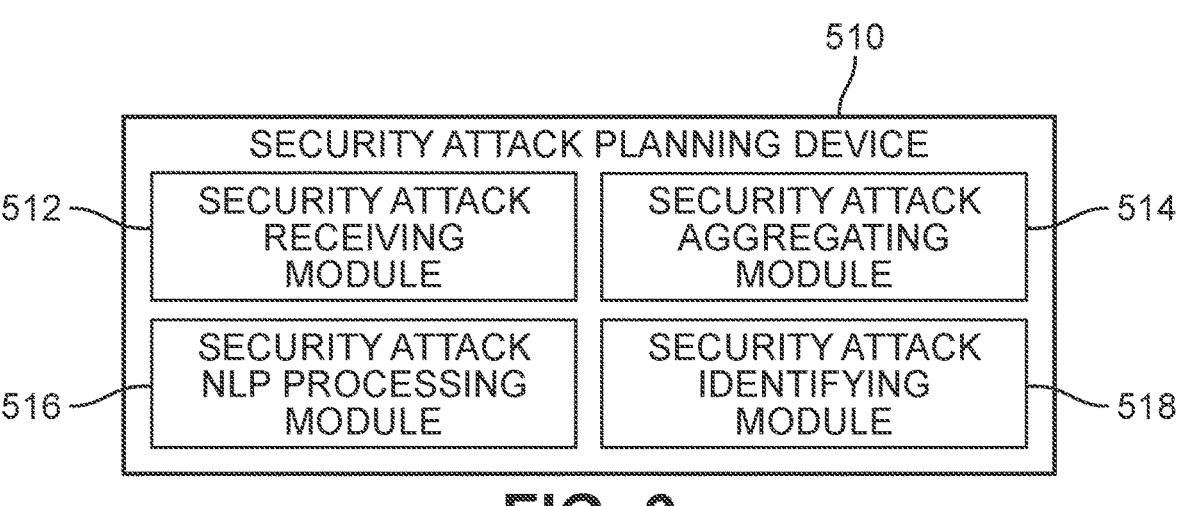
FIG. 6
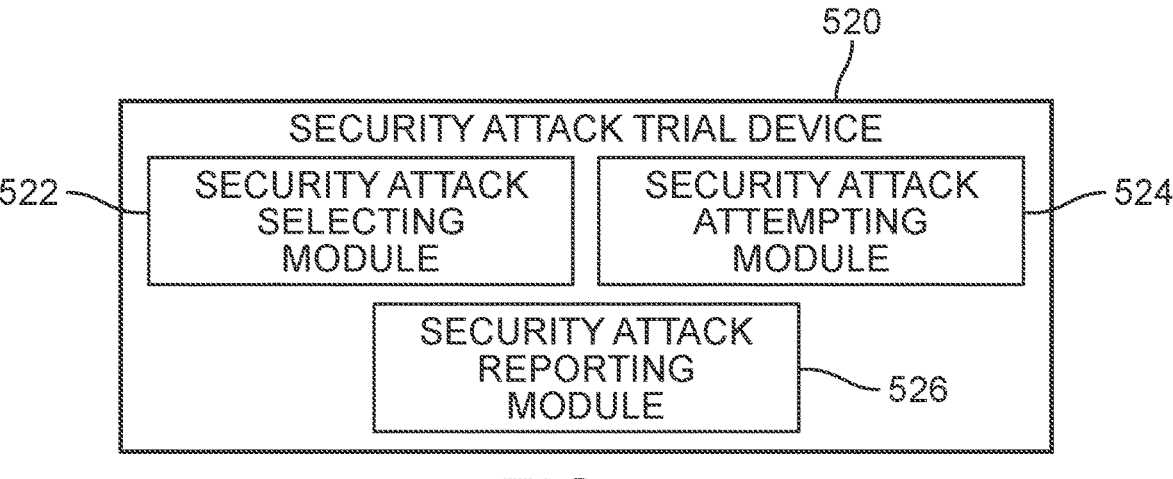
FIG. 7
SECURITY ATTACK LEARNING DEVICE
532 — SECURITY ATTACK ML MODULE
SECURITY ATTACK MODEL REPORTING MODULE — 534
530
FIG. 8

600

GATHER PAST
ATTACK INFO — 610

GATHER CURRENT
ATTACK INFO — 620

AGGREGATE
ATTACK INFO — 630

700

PROCESS ATTACK
INFO WITH NLP — 710

IDENTIFY ATTACKS
TO ATTEMPT — 720

ATTEMPT
ATTACKS — 730

710

900

MACHINE LEARNING NETWORK SECURITY TESTING SYSTEM

CROSS-REFERENCE TO RELATED APPLICATIONS

This application claims the benefit of U.S. Provisional Patent Application Ser. No. 63/284,401 filed on Nov. 30, 2021 and titled "Machine Learning Hacking Agent." The disclosure of which is incorporated by reference in its entirety.

TECHNICAL FIELD

The present disclosure generally relates to methods and systems for providing a machine learning network security testing system. Specifically, the present disclosure provides a program that identifies possible security attacks to attempt on a target network. By attempting the security attacks and using machine learning, the program learns which security attacks succeed. Based on such learning, the program exposes security problems in a system.

BACKGROUND

When hosting a network, it may be important to detect security vulnerabilities in the network. Malicious actors may attack a network. Determining possible attacks may help block these attacks, reduce impact, or repair damage caused by such attacks. Some tools, such as a vulnerability scanner, can analyze a computer system in search of known vulnerabilities. Such vulnerabilities may include open ports, insecure software configurations, and susceptibility to malware, as examples.

However, such vulnerability scanning and other security measures are passive only, and must be told what to do and be given patches or repair methods. Accordingly, networks are still vulnerable to new security threats that are not yet recognized and mitigated.

There is a need in the art for a system and method that addresses the shortcomings discussed above.

SUMMARY

In one aspect, a computer-implemented method of training a security model in a testing system using machine learning is disclosed. The method includes a step of accessing information about security attacks from at least one security attack information source. The method further includes a step of recognizing types of security attacks being attempted using natural language processing to process the information about the security attacks. The method further includes a step of attempting at least one of the recognized types of security attacks on a network. The method further includes a step of identifying at least one security vulnerability based on results of the attempting. The method further includes a step of training the security model based on the identified at least one security vulnerability using machine learning. The method further includes a step of providing the trained security model to a user of the network. The method further includes a step of blocking a security attack using the trained security model.

In another aspect, a system for training a security model in a testing system using machine learning includes at least one processor configured to access information about security attacks from at least one security attack information source. The at least one processor is further configured to recognize types of security attacks being attempted using natural language processing to process the information about the security attacks. The at least one processor is further configured to attempt at least one of the recognized types of security attacks on a network. The at least one processor is further configured to identify at least one security vulnerability based on results of the attempting. The at least one processor is further configured to train the security model based on the identified at least one security vulnerability using machine learning. The at least one processor is further configured to provide the trained security model to a user of the network. The at least one processor is further configured to block a security attack using the trained security model.

In another aspect, a computer-implemented method of improving the security of a network using machine learning is disclosed. The method includes a step of accessing information about security attacks from at least one security attack information source. The method further includes a step of recognizing types of security attacks being attempted using natural language processing to process the information about the security attacks. The method further includes a step of attempting at least one of the recognized types of security attacks on the network. The method further includes a step of identifying at least one security vulnerability based on results of the attempting. The method further includes a step of training the security model based on the identified at least one security vulnerability using machine learning. The method further includes a step of providing instructions to repair the at least one security vulnerability for the network using the security model.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 6 is a schematic view of security attack planning device for a hacking agent using machine learning (ML) to identify security vulnerabilities in a network, according to an embodiment;

FIG. 7 is a schematic view of security attack trial device for a hacking agent using machine learning (ML) to identify security vulnerabilities in a network, according to an embodiment;

FIG. 8 is a schematic view of security attack learning device for a hacking agent using machine learning (ML) to identify security vulnerabilities in a network, according to an embodiment;

DETAILED DESCRIPTION

Figure 1:
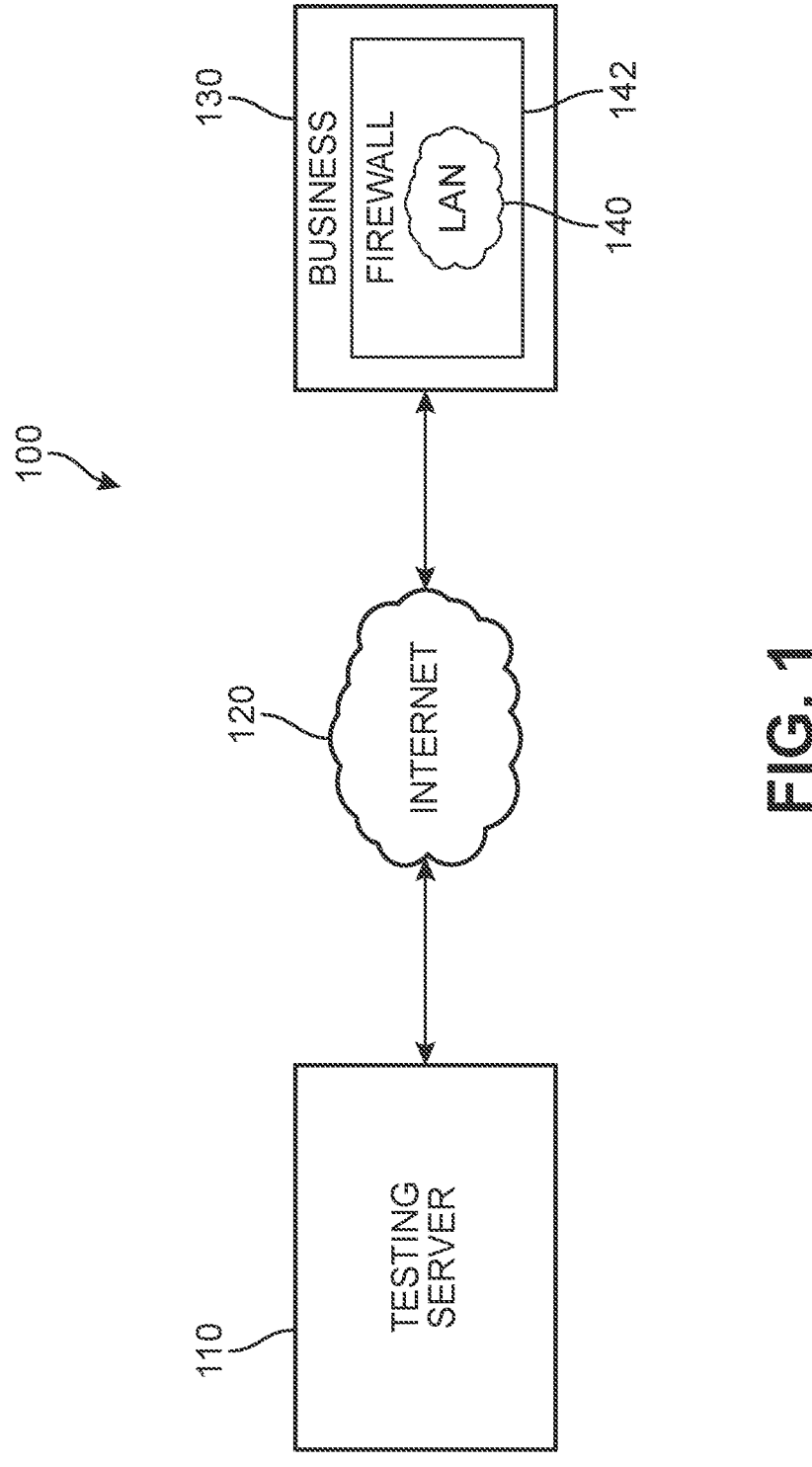
FIG. 1 is a schematic view of a testing server that can launch test security attacks on a network in a testing system, according to an embodiment.

Computer security, in particular computer network security, is a field of critical importance. People increasingly rely on computers and computer networks for the successful functioning of society. Embodiments provide an improved way to automate tasks that would otherwise be performed by a white hat hacker to improve the security of a computer network. For example, embodiments may automatically gather information about possible hacking techniques. The information may include information about past hacks. Embodiments also infer information about new hacks by searching the Internet and processing documents using natural language processing (NLP). While some of the embodiments discussed herein focus on NLP, other known automated statistical methods may also be used to process the documents. The embodiments employ an ML hacking agent that experiments with various hacks. Based on the experimentation, the ML hacking agent learns a security model that can help ensure the security of a computer system or network.

In general, a computer hacker is a person who uses technical knowledge to achieve a goal or overcome an obstacle, within a computerized system, by utilizing unintended access methods. For example, a security hacker is a person who utilizes his or her technical know-how of bugs or exploits to gain unauthorized access into computer systems and access data which would otherwise be unavailable to the security hacker. Security hackers are motivated by different goals.

White hat hackers are hackers who work to keep data safe from other hackers. White hat hackers do so by finding system vulnerabilities to mitigate. By contrast, Black hat hackers are hackers with malicious intentions. Gray hat hackers include those who hack for fun or to troll. Both gray hat hackers and black hackers attempt non-consensual and potentially damaging security attacks.

Businesses may wish to defend themselves from such attacks by hiring white hat hackers to identify and patch security holes in their networks and intrusion countermeasures present in their networks. However, it may be expensive to pay for the services of a white hat hacker. Further, due to resource limitations, humans typically prioritize and thus may investigate limited hacking methods.

Due to these issues with using white hat hackers to protect networks, embodiments train a machine learning (ML) hacking agent to attempt security attacks (also referred to herein as "hacks") against the computer security architecture of a network. For example, embodiments train the ML hacking agent to attack security measures such as a firewall and other security measures, such as those of a local network of a business. By attempting such attacks, the ML hacking agent learns where the security of the network is strong, and where it is vulnerable. Based on the learning, the ML hacking agent adapts its attacks to further identify other vulnerabilities. Learning is positively reinforced by a hierarchy of accomplishments such as but not limited to successful login, successful data retrieval, ability to create a backdoor for future access, number of server instances accessed behind a firewall, etc. Each of these accomplishments can be assigned a numeric success rating for gradient type learning.

Attempted security attacks may include previous security attacks or new security attacks. Previous security attacks include techniques that were previously attempted on the tested system or on other systems. New security attacks include techniques that are not generally known, such as techniques original to a hacker. Vulnerability scanning techniques of various types may be sufficient to identify danger from previous security attacks. However, existing vulnerability scanners are not able to automatically adapt to and detect new vulnerabilities.

Thus, the ML hacking agent may also use new security attacks. For example, the ML hacking agent may gather information from the Internet to process for identifying new security attacks that are emerging or increasing in commonality like ransomware attacks. An ML hacking agent can experiment with new hacks in a testing system based on such information. For example, the ML hacking agent may use a search engine to find appropriate documents. Additionally, the ML hacking agent may access network content such as online message boards, e-mails, websites, social media sites, etc. The gathered information yields hacks by using natural language processing (NLP). Based on the NLP processing, the ML hacking agent learns how to carry out new techniques (steps in a procedure) for a security attack. For example, a hacker may post, on a message board, information about how to introduce a Trojan into a network.

The ML hacking agent sees which techniques work and which techniques fail. The security attacks may be carried out in a way that no lasting damage occurs. For example, the agent performs the security attacks to be reversible. Alternatively, the agent may use an inert payload. A security model trains based on the results. The security model may include information about successful breaches as well as unsuccessful breaches.

In general, hacks include categories such as backdoors, denial-of-service attack, direct-access attack, eavesdropping, multi-vector/polymorphic attacks, phishing, privilege escalation, reverse engineering, side-channel attacks, social engineering attacks, spoofing, tampering, and malware. Other hacking techniques are possible. In particular, the ML hacking agent may learn new types of security attacks, and the new types of security attacks use other ways to penetrate security not listed above, or newly developed variants of these specified techniques.

Thus, the present system gathers information about potential hacks, such as from the Internet. The system uses NLP to process gathered information to learn how other hackers are trying to hack systems and how systems have been hacked in the past. The system attempts hacks and determines which are effective and which are not. The system identifies security vulnerabilities and uses machine learning (ML) to train a security model accordingly. Then, the system provides trained security model to a user for appropriate use (e.g., patching security holes). For example, the system may itself provide suggested actions that a user may use to fix a security hole. The system may even be able to fix some security holes itself. Thus, the ML hacking agent is a tool that may help expedite and automate techniques that would otherwise be performed manually by a white hat hacker.

FIG. 1 is a schematic view of a testing server that can launch test security attacks on a network in a testing system 100, according to an embodiment. In FIG. 1, testing server 110 communicates over the Internet 120 with a business 130. Business 130 includes a local area network (LAN) 140, where the LAN may have security measures in place such as a firewall 142, as a non-limiting example. However, the LAN may also have other security measures in place, such as antivirus software. Antivirus software (abbreviated to AV software), also known as anti-malware, is a computer program used to prevent, detect, and remove malware. Malware refers to malicious software designed to harm or exploit a programmable device or network.

Security software was originally developed to control access to data and functions. However, with the proliferation of other malware, security software started to protect from other computer threats. In particular, modern security software can protect users from malicious browser helper objects (BHOs), browser hijackers, ransomware, keyloggers, backdoors, rootkits, Trojan horses, worms, malicious layered service providers (LSPs), dialers, fraud tools, adware, and spyware. Some AV products also include protection from other computer threats, such as infected and malicious uniform resource locators (URLs), spam, scam and phishing attacks, online identity (privacy), online banking attacks, social engineering techniques, advanced persistent threat (APT), and botnet distributed denial-of-service (DDOS) attacks.

However, an issue with security measures such as a firewall or antivirus software is that they defend against known threats that they have been previously designed to prevent and/or fix. Hence, it is important to provide a tool that is capable of identifying new threats, assessing vulnerability, and notifying users of these new threats.

In FIG. 1, a business 130 may desire to determine the strength of the security of its LAN 140. In the example of FIG. 1, the business 130 communicates with the testing server 110 over the Internet 120. Embodiments discussed with respect to FIGS. 1-4 are presented with respect to LAN 140. However, the business 130 may include any computer/device that may be hacked. For example, the business 130 may be connected to the Internet 120. The business may also be connected to peripherals. Attacks may be launched through these peripheral channels as well (printer buffer, keylogger, etc.). Connections with the peripherals and with the Internet 120 by the business 130 may be wired and/or wireless.

Business 130 may interact with simulated users during attacks where appropriate to identify security holes (such as brute force password attacks) or may be attacked by software automatically. Business 130 may have multiple roles in a network (e.g., Server, Client, Peer-to-Peer, Router, Switch, etc.). Based on a role a business 130 has in a network, it may affect the attacks used against the business 130.

While FIG. 1 indicates that element 120 is the Internet, the testing server 110 and the LAN 140 may use another intermediate connection. For example, another wide area network (WAN), or another cloud network connects the testing server 110 and the LAN 140 in lieu of the Internet 120. Attacks may use such an alternative network as another way of launching experimental network attacks.

Figure 2:
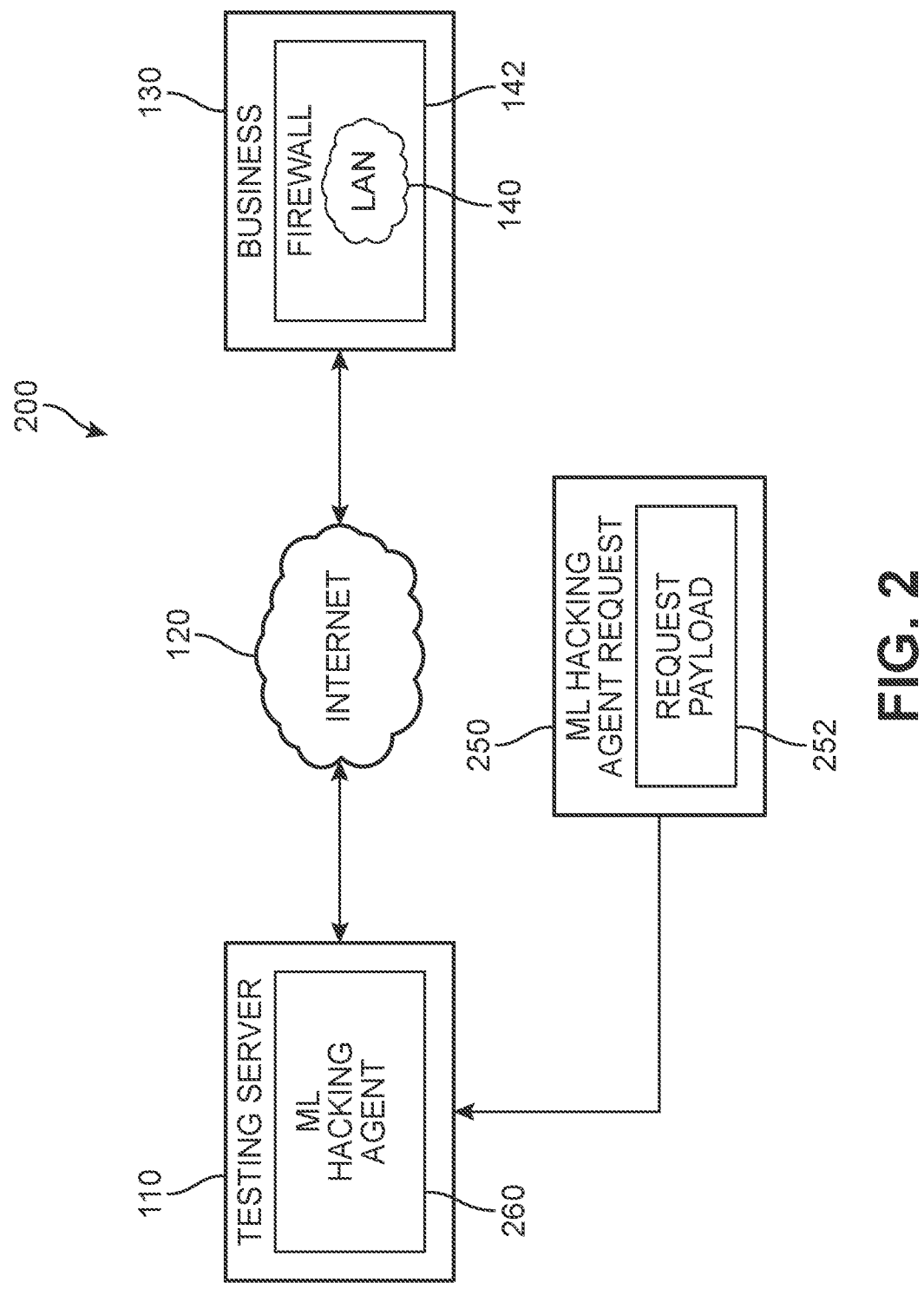
FIG. 2 is a schematic view of a testing server that receives a request to launch test security attacks in a testing system, according to an embodiment.

FIG. 2 is a schematic view of a testing server that receives a request to launch test security attacks in a testing system 200, according to an embodiment. In FIG. 2, testing server 110, the Internet 120, business 130, and LAN 140 correspond to the appropriate elements of FIG. 1. However, in FIG. 2, the business 130 also deploys a machine learning (ML) hacking agent request 250 and a machine learning (ML) hacking agent 260 hosted in the testing server 110.

For example, the business 130 may intend to begin a security testing process with the help of the testing server 110 and the ML hacking agent 260. The business 130 sends ML hacking agent request 250 to testing server 110. ML hacking agent request 250 is an indicator that the business desires to initiate the security testing process. The provision of ML hacking agent request 250 is illustrated as being separate from the communication between testing server 110 and business 130 over the Internet 120 in FIG. 2. However, the ML hacking agent request 250 may also occur over the Internet 120.

At the testing server 110, the ML hacking agent 260 receives the ML hacking agent request 250. The ML hacking agent request 250 includes a request payload 252 that causes the ML hacking agent 260 to begin a security test of business 130 and its corresponding LAN 140 and firewall 142. For example, the request payload 252 of the ML hacking agent request 250 may also include information about how to conduct the test hacking process. For example, the request payload 252 may specify particular attacks the business 130 would like the ML hacking agent 260 to attempt. The request payload 252 may also include information about particular attack parameters the business 130 would like the ML hacking agent 260 to use.

For example, the particular attacks may specify at least one type of attack, and the parameters may specify more details. For example, the business 130 may wish to assess its vulnerability to ransomware attacks. To do so, the business 130 may wish the establish vulnerability to particular existing ransomware attacks, such as Reveton or CryptoLocker. However, these are only examples and many other existing ransomware attacks may be attempted as part of the vulnerability assessment.

However, the business 130 may also wish to establish vulnerability to new ransomware attacks. As is discussed further with respect to FIG. 3, the business 130 may instruct the ML hacking agent 260 to assess vulnerability to ransomware in general, including not only a variety of known ransomware attacks, but also learn about new ransomware attacks and assess vulnerability to these new ransomware attacks.

Figure 3:
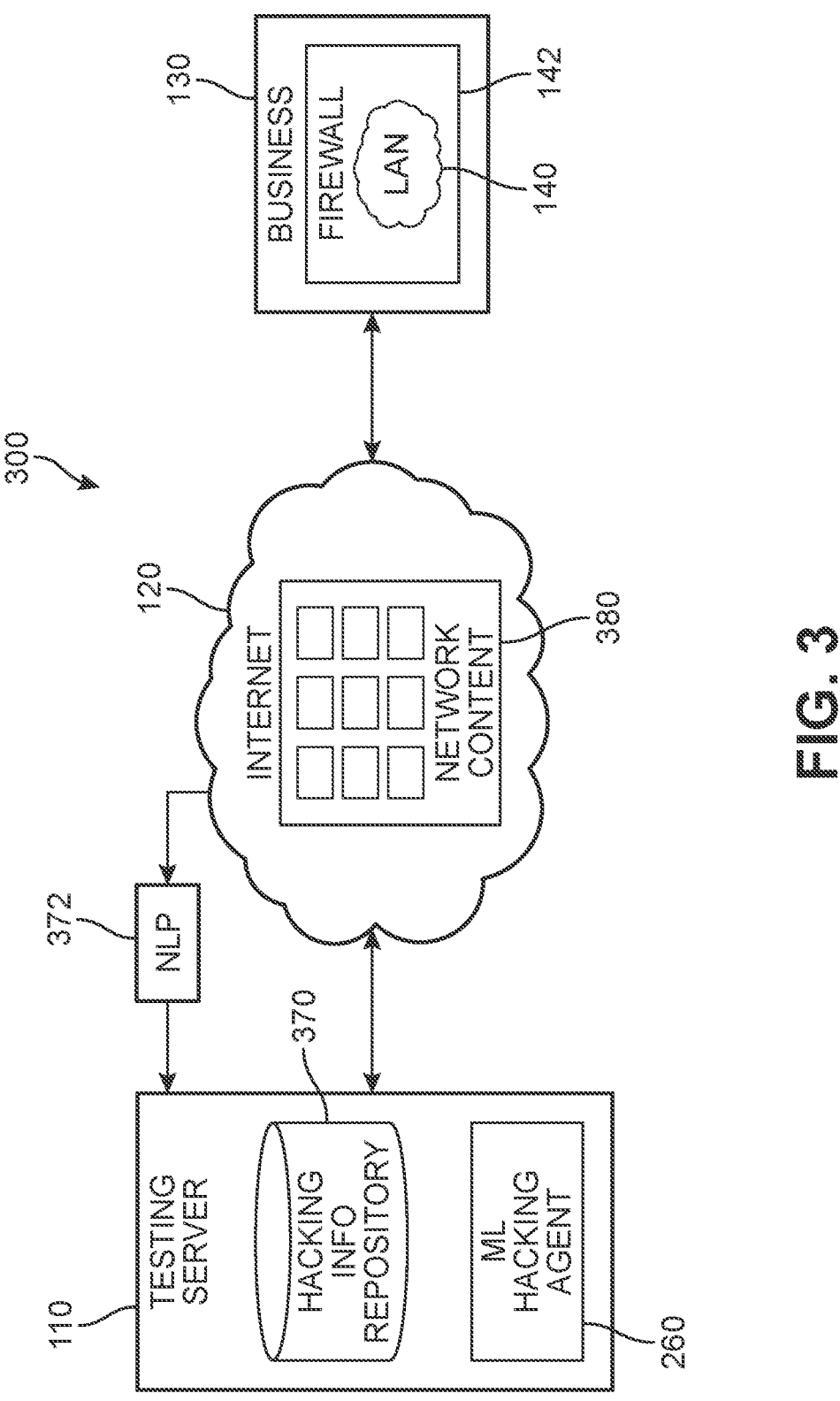
FIG. 3 is a schematic view of a testing server that gathers information to launch test security attacks on a network in a testing system, according to an embodiment.

FIG. 3 is a schematic view of a testing server that gathers information to launch test security attacks on a network in a testing system 300, according to an embodiment. In FIG. 3, testing server 110, the Internet 120, business 130, LAN 140, and ML hacking agent 260 correspond to the appropriate elements of FIGS. 1-2.

FIG. 3 also shows a hacking information repository 370 and network content 380 in the Internet 120. FIG. 3 also shows how information from the Internet can be used as information for an NLP processing 372. Further details of the NLP processing 372 are discussed in FIG. 13. For example, network content 380 shows content that may be germane to hacking techniques. Network content 380 may include browser windows, web pages, files, messages, documents, and so on. The network content 380 may include information linked to by web pages, files, content, or documents stored on the Internet.

Such content may be found using search engines. However, often content related to illegal hacking is not indexed on normal search engines, and is said to reside on the "dark web." Thus, the NLP processing 372 may also access such "dark web" content by using alternative search techniques.

To access the network content 380 using search engines, the testing server 110 may use a variety of approaches. First, the testing server 110 may search for keywords on a list of keywords related to types of security attacks. For example, the testing server could search for "ransomware." Second, the testing server may search for keywords on a list of keywords related to particular known security attacks, such as "Stuxnet." Third, the testing server may search for keywords on a list of keywords related to particular known hackers or hacking groups, such as "Cozy Bear" or "NCBH."

If security attack techniques are derived from black hat and gray hat hackers, the hackers may conceal information about the security attacks on the deep web. The deep web, also referred to as the invisible web or hidden web, includes parts of the World Wide Web whose contents are not indexed by standard web search engines. To access the deep web, a user may use a direct URL or IP address. Deep web content may also require a password or other security credential.

A portion of the deep web that is particularly relevant to security attacks is the dark web. The dark web is the World Wide Web content that exists on darknets. Darknets are special networks that use the Internet but require specific software, configurations, or authorization to access. Darknets (servers) differ from the deep web (content) in that the deep web refers to any site that is not accessible through a traditional search engine. The dark web is intentionally hidden and is inaccessible through standard browsers and methods. In the dark web, private computer networks can operate anonymously. Much dark web content is illicit, such as access to illegal goods and services. Some of the dark web is related to hacking groups and services and cryptocurrency such as Bitcoin. Hence, dark web content is often related to hacking.

In addition to standard search engines, the testing server 110 may use specialized search engines and browsers to access information from the deep web and/or the dark web. For example, the testing server 110 may have (or identify using results from a search engine) a list of web sites on the deep web or dark web that may be a good source of information related to new security attacks. Such a list of web sites may be supplemented with login credentials such as usernames, passwords, and so on. This approach may maximize the ability of the testing server 110 to access novel hacking techniques.

For example, hackers may post messages, pseudocode, or actual code describing hacking techniques. The NLP processing 372 retrieves content from the network content 380.

The NLP processing 372 then determines which content pertains to hacking techniques. As noted, one content source is the set of retrievable content through an Internet search engine. However, not all content is searchable, and the retrieval may also gather other relevant information for storage in hacking information repository 370.

Hacking information repository 370 stores information about methods corresponding to the identified security attacks, for use in security testing. Hacking information repository 370 is also able to store documents for NLP processing 372. Hence, NLP processing 372 extracts usable hacking information from the network content 380.

For example, the NLP processing 372 may use NLP techniques such as statistical methods, for example neural networks. The NLP processing 372 may include text processing, morphological analysis, syntactic analysis, lexical semantics, relational semantics, and discourse analysis. Progressively analyzing documents using these techniques allows higher-level processing of the example documents. For example, the NLP processing 372 may allow for automatic summarization (text summarization) or natural language understanding (NLU). These techniques allow the ML hacking agent 260 to derive hacking algorithms from the gathered information.

To use NLP, the NLP processing 372 uses the retrieved content to create attack methods. NLP processing 372 will realize that some of the gathered information already includes programs, scripts, or code that may be used with little adaptation to use in experimental attacks. NLP processing 372 can also adapt text descriptions, flowcharts, and textual descriptions of hacking approaches for use in attack strategies. For example, NLP processing 372 may process a hacker's description of a technique and the results are adapted for use in an attack.

As an example, a hacker may boast in a message board about a technique they have developed, such as a zero-day exploit. The NLP processing 372 may recognize what is involved in the exploit, so it can assess the test system's vulnerability to the exploit and understand what algorithm or steps are involved in the exploit for testing purposes. Additional aspects of the NLP processing 372 are discussed in FIG. 13, below.

Figure 4:
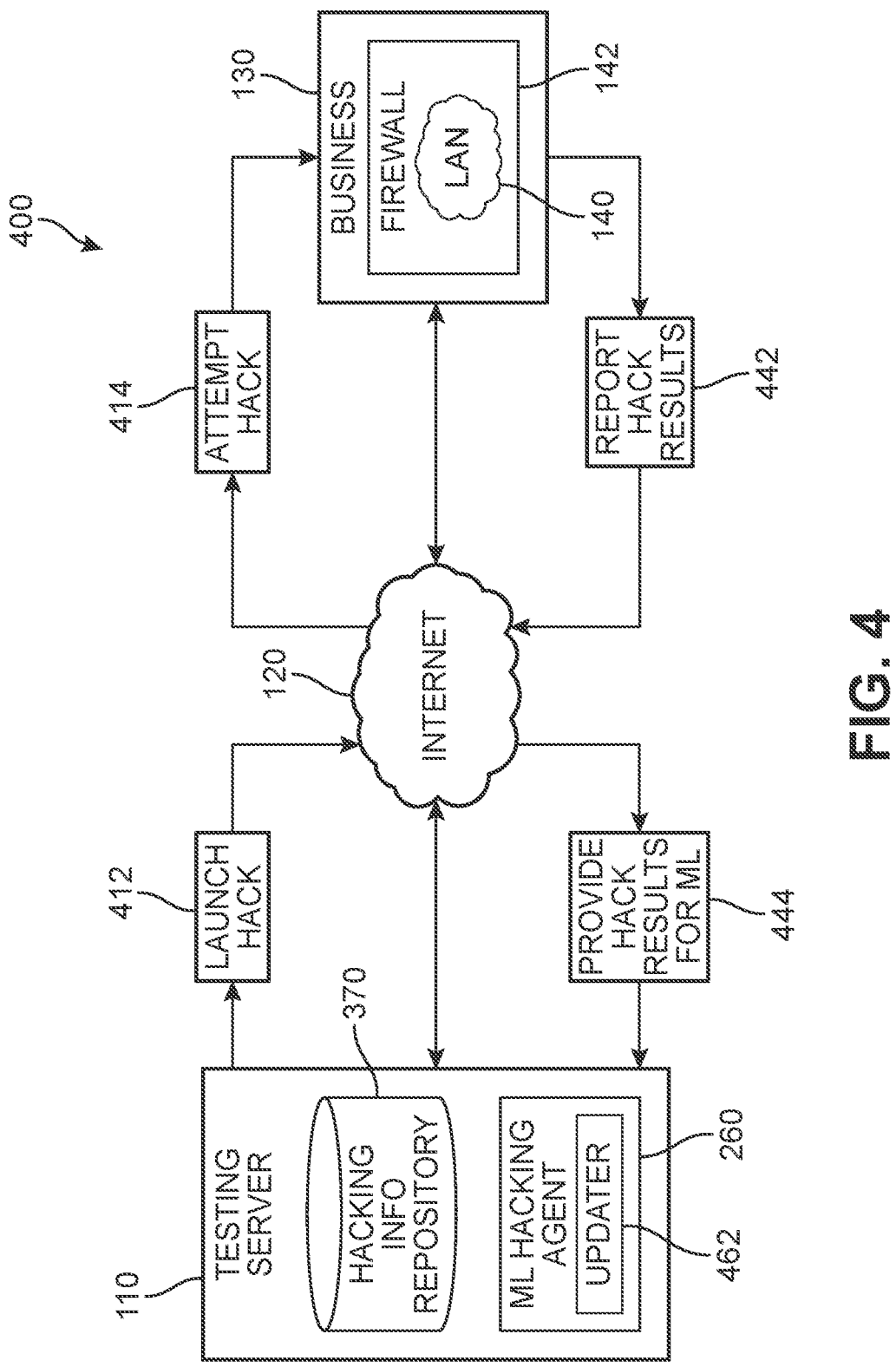
FIG. 4 is a schematic view of a testing server that launches test security attacks on a network in a testing system, according to an embodiment.

FIG. 4 is a schematic view of a testing server that launches test security attacks on a network in a testing system 400, according to an embodiment. In FIG. 4, testing server 110, the Internet 120, business 130, LAN 140, firewall 142, ML hacking agent 260, and hacking information repository 370 correspond to the appropriate elements of FIGS. 1-3. In FIG. 4, the ML hacking agent 260 also includes an updater 462. The updater 462 trains the ML hacking agent 260 as it attempts hacks and observes the results of such hacks.

FIG. 4 also shows that the testing server 110 includes a hacking information repository 370, which corresponds to hacking information repository 370 of FIG. 3. In FIG. 3, embodiments prepare the hacking information repository 370 by identifying types of hacks to attempt. The hacking information repository 370 stores information such as algorithms, code, or pseudocode for various kinds of attacks, as well as information about which parameters to use for the attacks.

For example, in FIG. 4, the testing server 110 launches an attack 412 into the Internet, which allows an attempt of the attack 414 on the business 130 and the LAN 140. The LAN 140 may be protected by a firewall 142 and other computer security hardware and software, such as antivirus software. The business 130 checks to see if the attempted attack 414 has breached the LAN 140 and its firewall 142.

For example, the goal of an attempted attack may be to install a payload into the LAN 140. The payload would ordinarily include undesirable software. For example, undesirable software may include malware or adware. Malware may include a program that infects and damages a system, such as a virus, a Trojan, or ransomware. Adware displays unwanted advertisements on a system. While not as damaging as malware, adware is still undesirable software. Instead of actual undesired software, the ML hacking agent 260 may install an inert payload. The inert payload essentially indicates that, had damaging content actually been included, it would have infected the LAN 140 with the damaging content.

Alternatively, the hack may simulate or carefully install actual damaging content in a controlled way. The hack may actually cause the infection, and then repair or reverse the infection. However, extreme care is to be taken with actual damaging content to ensure no irreversible damage occurs to the LAN 140 or other aspects of the business infrastructure. Thus, attempted attacks must either have an inert payload that causes no harm, or must cause effects that may be undone.

The ML hacking agent 260 may be able to try brute force attacks that would be difficult for a human white hat hacker. The ML hacking agent 260 may also try attacks that involve many different parameters. For example, while a human might try a technique with only a few parameters, the ML hacking agent 260 may try out all or many possible parameters for that technique.

The ML hacking agent 260 may try hacks that are entirely performed by a machine, as well as hacks that take advantage of tricking a user. Thus, it may be appropriate to divide hacks into security infrastructure hacks (for example, a deactivated firewall) and user deception hacks (for example, spoofing). Some hybrid hacks combine aspects of security infrastructure and user deception hacks.

As the ML hacking agent 260 tries exploits, it observes the results. The results include whether the attack is successful, and if so what type of success/breach was achieved. The ML hacking agent 260 may learn for the model that a Trojan was successfully blocked. Other hacks may be successful, and provide different advantages to a hacker. For example, a ransomware attack may be successful, leading to the user's information being locked for ransom. Other hacks may cause gaining access to sensitive information or causing a malfunction at the breached system.

For example, FIG. 4 shows how the ML hacking agent 260 launches a hack 412 and attempts a hack 414, using the Internet 120 or another network connection. The business 130 reports back the results through the Internet 120, sending a report hack results 442 follows by providing hack results for machine learning (ML) 444.

Using machine learning techniques, the ML hacking agent 260 learns a trained security model including information about what was blocked and which hacks were successful in what way. Machine learning may occur in a number of ways. Such learning may occur in the embodiment of FIG. 4 by using updater 462.

For example, machine learning includes supervised learning, unsupervised learning, and reinforcement learning. In supervised learning, the computer is presented with example inputs and corresponding desired outputs and the goal is learn a rule to map inputs to outputs. In unsupervised learning, the learning algorithm receives data without labels, and the learning algorithm finds structure in the input. In reinforcement learning, the algorithm must perform a certain goal, and the algorithm uses feedback to reach the goal.

These various ML approaches find patterns between attempted hacks and their results.

For example, unsupervised and reinforcement learning may be especially helpful. Unsupervised learning can find patterns with respect to which hacks succeed and which fail. Reinforcement learning may change which hacks the ML hacking agent 260 attempts based on which hacks succeed and fail.

The model has immediate value because it can substitute for a human white hat hacker as above. The model may also include techniques to repair the security holes or even enact such repairs itself. The model may also continually update itself as information about new security attacks becomes available on the Internet, try out such new security attacks, and assess vulnerability and fixes.

Figure 5:
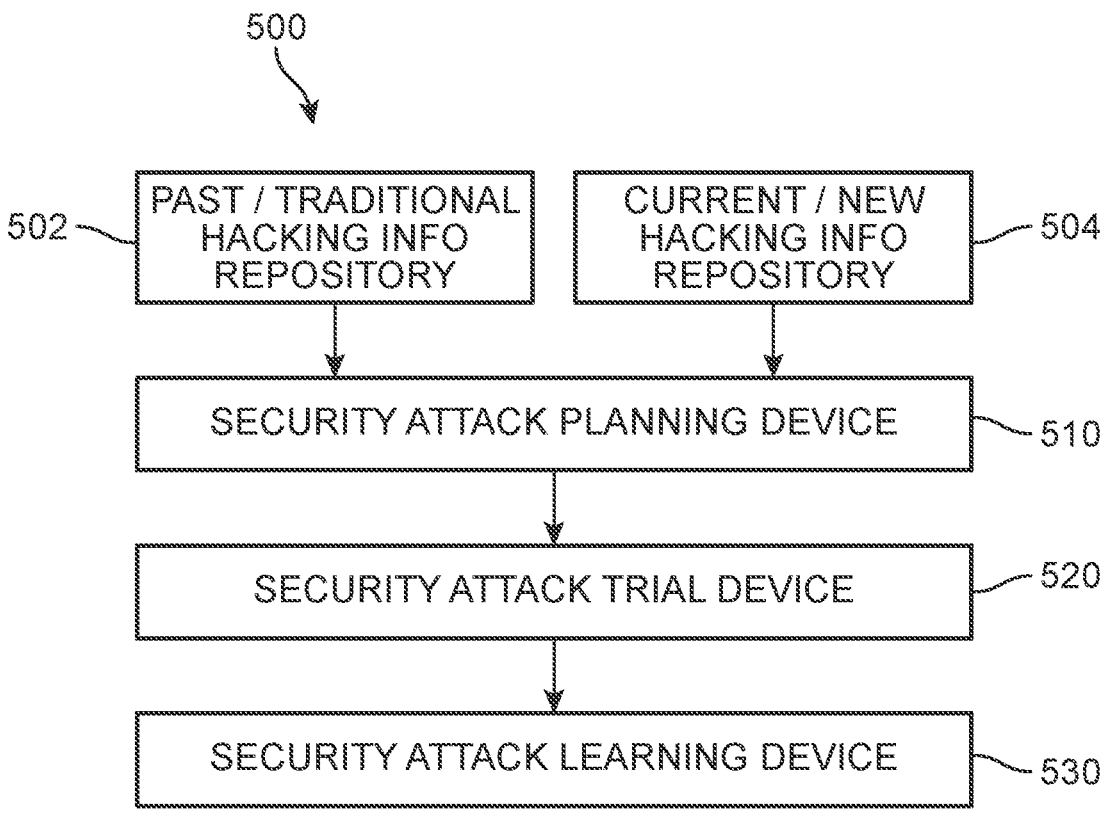
FIG. 5 is a schematic view of a system that trains a hacking agent using machine learning (ML) to identify security vulnerabilities in a network, according to an embodiment.

FIG. 5 is a schematic view of a system 500 that trains a hacking agent that uses machine learning (ML) to identify security vulnerabilities in a network, according to an embodiment. The system 500 begins with past/traditional hacking information repository 502 and current/new hacking information repository 504. These repositories may be implemented together or separately at hacking information repository 370.

For example, past/traditional hacking information repository 502 stores previously existing information about hacks that the ML hacking agent 260 may attempt. For example, the past/traditional hacking information repository 502 stores algorithms that the ML hacking agent 260 may use for attempted attacks. For example, the past/traditional hacking information repository 502 stores information about using brute force to guess a password. Such a brute force attack may also use a dictionary to expedite brute force password guessing. These are examples of previously existing tools, as brute force password guessing is a traditional type of security attack.

As another example, current/new hacking information repository 504 stores novel information about learned hacks that the ML hacking agent 260 may attempt. For example, the current/new hacking information repository 504 learns algorithms as discussed in FIG. 3. Embodiments derive such algorithms from natural language processing of documents, as discussed above. For example, a new algorithm may provide an improvement to brute force password guessing by providing a previously unknown way to access passwords at another account.

The ML hacking agent 260 chooses attack techniques to employ against the test system. As discussed above, the attack techniques may include a combination of pre-existing techniques and newly inferred techniques. However, it may be a priority of the ML hacking agent 260 to focus on newly inferred techniques, in that existing vulnerability scanners may already assess vulnerability to pre-existing security attacks. The ML hacking agent 260 is particularly valuable because of its ability to identify and test out new attacks.

The ML hacking agent 260 may act to ensure that the testing does not cause lasting damage. The types of attacks may be chosen based on the kind of machine; attacks appropriate for a server may be different from those appropriate against a mobile device. Some types of attacks may require user inputs, so the ML hacking agent 260 may simulate various inputs to assess vulnerabilities.

Because the ML hacking agent 260 is automated, it may try brute force techniques or try attacks with large numbers of parametric variation in a way that humans cannot. The ML hacking agent 260 may decide to try other techniques based on the results of its hacking. The ML hacking agent 260 may use another technique that it previously decided not to apply or try other techniques or even develop its own techniques.

The information from past/traditional hacking information repository 502 and current/new hacking information repository 504 is provided to security attack planning device 510. Security attack planning device 510 provides information to security attack trial device 520. Security attack trial device 520 provides information to security attack learning device 530. Security attack planning device 510 ascertains which security attacks to attempt. Security attack trial device 520 attempts the attacks. Security attack learning device 530 observes the effects of the attempts, and trains a security attack module accordingly. For example, security attack planning device 510, security attack trial device 520, and security attack learning device 530 may implement the functions of testing server 110.

FIG. 6 is a schematic view of security attack planning device 510 for a hacking agent using machine learning (ML) to identify security vulnerabilities in a network, according to an embodiment. In an embodiment according to FIG. 6, security attack planning device 510 includes a security attack receiving module 512, a security attack aggregating module 514, a security attack NLP processing module 516, and a security attack identifying module 518. The security attack receiving module 512 gathers raw information that may be used to plan attacks, such as is shown in FIG. 3. Security attack aggregating module 514 gathers the raw information to identify relevant information for NLP processing. Security attack NLP processing module 516 conducts the NLP processing, as discussed further in FIG. 13. Security attack identifying module 518 uses the results of the NLP to establish which security attacks are available for the security testing. However, these are only example modules, and other embodiments may use different structures or approaches.

FIG. 7 is a schematic view of security attack trial device 520 for a hacking agent using machine learning (ML) to identify security vulnerabilities in a network, according to an embodiment.

In an embodiment according to FIG. 7, security attack trial device 520 includes a security attack selecting module 522, a security attack attempting module 524, and a security attack reporting module 526. Security attack selecting module 522 selects particular security attacks to attempt. For example, the particular security attacks may be based on request payload 252. Security attack attempting module 524 then attempts the selected security attacks, as shown in FIG. 4 at 412 and 414. Security attack reporting module 526 provides results of the attempted attacks. For example, the results are provided as shown in FIG. 4 at 442 and 444, to updater 462 at ML hacking agent 260. However, these are only example modules, and other embodiments may use different structures or approaches.

FIG. 8 is a schematic view of security attack learning device 530 for a hacking agent using machine learning (ML) to identify security vulnerabilities in a network, according to an embodiment. In an embodiment according to FIG. 8, security attack learning device 530 includes a security attack machine learning (ML) module 532 and a security attack model reporting module 534. For example, the security attack machine learning (ML) module 532 learns security vulnerabilities based on information received from security attack reporting module 526. Such learning may be performed by updater 462, as shown in FIG. 4. The learning may be supervised learning, unsupervised learning, or reinforcement learning, as non-limiting examples. Security attack model reporting module 534 provides the result of the learning to a user. For example, security attack model reporting module 534 may generate a document, such as a word processing document or a web page summarizing the security results, or may display such results for a user. However, these are only example modules, and other embodiments may use different structures or approaches.

Figure 9:
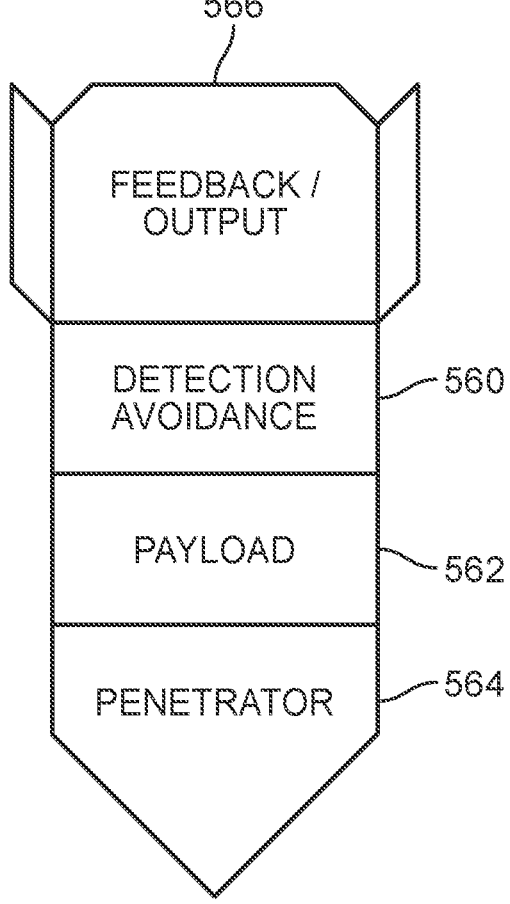
FIG. 9 is a schematic diagram of using hacking information and network content with natural language processing (NLP) to construct a security attack, according to an embodiment.

FIG. 9 is a schematic diagram of using hacking information and network content with natural language processing (NLP) to construct a security attack, according to an embodiment. As shown in FIG. 4, the security attack is attempted at 414 and reported at 442. The security attack establishes vulnerabilities by performing a number of tests as part of an information technology (IT) audit. The IT audit establishes various aspects of which security aspects of the IT infrastructure of a business 130 are secure and which are vulnerable. FIG. 9 shows a diagram of different portions of a security attack that form a template into which material about attacks from network content 380 may be integrated. For example, various pieces of network content 380 may be identified, analyzed, and synthesized into material for a security attack when gathering network content 380. This process may use NLP to understand aspects of the network content 380 that suggest particular techniques to be used when conducting the security attack. Constructing a security attack may also use material from hacking information repository 370.

For example, the security attack as shown in FIG. 9 may include elements of detection avoidance 560, payload 562, penetrator 564, and feedback/output 566. These elements may be code or strategies for a successful attack. Such elements may be derived from known approaches, such as presented in the hacking information repository 370. The elements of the security attack may also derive security attack strategies by using NLP to recognize keywords indicating disclosure of new strategies, as appropriate. For example, detection avoidance 560 includes approaches to prevent discovery of an attack, payload 562 includes implementation of an attack type that has a desired effect on an attacked system, and penetrator 564 includes approaches to defeat security measures. Feedback/output 566 includes aspects of organizing information that may be provided to a user of the testing server 110 based on running the security attack. Feedback/output 566 also defines how to provide such results.

Thus, in the embodiment of FIG. 9, there may be network content 380 that includes information discussing detection avoidance 560 and information about a particular strategy for detection avoidance. Likewise, network content 380 may include information discussing a payload 562 and information about a particular type of payload 562. The payload 562 may be an inert payload to avoid damage during testing. The inert payload may merely determine vulnerability to a particular form of attack, rather than actually causing damage. Alternatively, the payload 562 may cause reversible damage, and may then reverse the damage when the IT audit is complete. Similarly, network content 380 may include information discussing being a penetrator 564 and information about a particular attack for penetration.

In FIG. 9, NLP identifies and processes the network content 380 by doing topic analysis/identification to determine which portions of the network content 380 correspond to portions of the security attack. Once topics are identified, the NLP performs summary and analysis on the network content 380 to derive information for the detection avoidance 560, payload 562, and penetrator 564. By combining such information with information from hacking information repository 370, a security attack gathers enough information to be used in testing for the IT audit, yielding feedback/output 566.

For example, the detection avoidance 560 includes information about techniques the security attack may use when attempting an attack to avoid detection by the underlying business 130 or a protective measure such as firewall 142. As an example, the NLP techniques may consider text in the network content 380 that refers to detection avoidance 560 or related terms. As a particular example, the text may describe a situation in which, to avoid detection, malware uses special sandbox evasion techniques. Such techniques may be based on detecting user interactions as a way to avoid detection before activating. The text may discuss how some malware may be programmed to check the speed of mouse movements and mouse clicks and remain inactive if the speed is suspiciously fast. For example, the trojan Trojan.APT.BaneChant tracks mouse clicks to avoid standard sandbox evasion techniques by only activating after a certain number of mouse clicks are made by a user.

This is only an example, and the NLP techniques may consider additional information that, when analyzed, discusses ways of structuring a security attack in a way that the damage to be done by the security attack avoids detection. Such an attack is undetected by any preventative software, such as, for example, the firewall 142 or alternative anti-malware or antivirus software. A distinguishing aspect of detection avoidance 560 techniques by contrast to payload 562 is that detection avoidance 560 techniques include ways of delivering payload 562 without interception. Thus, detection avoidance 560 allows for payload 562 to have its intended effect without triggering detection (and countermeasures) that would otherwise result if the payload 562 were not accompanied by the detection avoidance 560 features.

For example, the payload 562 may identify a particular technique for attacking the business 130 to see if the business 130 is susceptible to such an attack. The payload 562 may include a number of attack techniques that, when used in a test attack, help determine where the system has good security and where the system is vulnerable. For example, the payload 562 may use the NLP techniques to consider text in the network content 380 that discuss particular security attacks and ways to carry them out.

In some embodiments, such security attacks included in the payload 562 may be novel security attacks. For example, the payload 562 could process the text in the network content 380 using NLP techniques. Such text may consider text in the network content 380 that refers to a technique that is identified as a payload 562 or by a similar term in the text. As an example, the NLP techniques may consider text that discusses using a particular payload as a form of attack on a system. The text may discuss using a multifunctional payload such as an exploit, a backdoor, a bypass antivirus (AV) technique, an autorun technique, and so on.

As a particular example, the text may discuss the use of an exploit-creating tool such as TheFatRat. TheFatRat produces a payload 562 that produces an exploit that achieves unauthorized access into business 130, where the payload 562 takes the form of a block of code, such as C language code. Thus, the NLP techniques may consider the description of TheFatRat and may use this description to create a payload that delivers an attack while disguised as source code. If the network content 380 described other types of payload 562, the NLP techniques could help determine what aspects of the business 130 to attack, such as the LAN 140 or the firewall 142. The NLP techniques could also identify ways to attack other portions of the business 130.

The penetrator 564 may use the NLP techniques to consider text in the network content 380 to consider text that discusses ways to overcome safeguards directly. The penetrator 564 considers techniques that will allow attacks to successfully affect the system 130, despite intrusion countermeasures such as a firewall 142 or other countermeasures such as antivirus software or other antimalware software. The penetrator 564 has effects that ignore and break through countermeasures rather than avoid them.

For example, the penetrator 564 may use the NLP techniques to consider text that discusses ways of introducing malware into a system even if the system has in place various intrusion countermeasures. As an example, the NLP techniques may consider text that discusses a technique such as SQL injection (SQLI). Such a technique may use malicious SQL code for backend database manipulation to access information that was not intended to be accessed or displayed. Such information may include information such as sensitive company data, user lists, and private customer details.

Once the security attack has been performed, using the detection avoidance 560, the payload 562, and the penetrator 564 to test various attacks, the security attack performs an IT audit on the system. The results of the security attack may be packaged and delivered using a feedback and output unit 566. For example, such a feedback and output unit 566 may information about how to format the results of the comprehensive IT audit. These results may be reported when the hack results are reported at the step of reporting hack results 442 as discussed in connection with FIG. 4, or may be reported or utilized in other ways. For example, there may be a template, provided using markup languages or another template, that indicates various results of performing the security attack in an organized manner for further use. Such a template may be provided to testing server 110. The testing server 110 may conduct further interactions with the business 130 to identify additional security properties of the business 130.

In some cases, the results of the security attack could involve various types of attempted attacks and their results. The results could include a determination of whether a given attacks is successful or unsuccessful. In some embodiments, the results could include more specifics of what a given attack is able to accomplish and what a given attack is unable to accomplish. In some cases, the attacks to perform could include an assessment of which access levels the security attack is able to achieve. In some embodiments, the attacks to perform could specify which regular user accounts the security attacks are able to access. In some cases, the attacks could specify which administrator user accounts or superuser accounts are accessible. In some embodiments, the attacks could specify which specific privileges that accompany such accounts, such as permissions for files or for changing settings, are accessible and inaccessible.

In some cases, the security attacks could attempt access to various programs of the business 130. In some embodiments, the security attacks may attempt to access features or functions of an operating system, a web browser, an e-mail program, office applications programs (such as a word processor, a spreadsheet program, a presentation program, etc.), multimedia applications programs (a photo editing program, a video editing program, a web design program, etc.), development environments, and databases or cloud functionality. The security attacks may determine which programs they are able to access, and with what level of access.

In some embodiments, the security attacks could attempt access to various devices and hardware of the business 130. For example, the security attacks may attempt to access or control basic parts of the hardware of the business 130, such as processors, memory, storage, and so on. However, the security attacks could also target hardware associated with vulnerabilities of the business 130. In some cases, the security attacks could target external memory devices or their interface with the business 130 to facilitate an attack. In some embodiments, the security attacks may access external memory devices, such as a thumb drive, an SD card (or a similar flash memory device), a hard drive, a solid-state drive, or an optical drive.

The security attacks may also attempt to assess the vulnerability of specific communication ports of the business 130. For example, particular interfaces may include attacking USB ports, Thunderbolt ports, and so on. The security attacks may also attempt to access and control network access and communication. Such network access may include wired network access, such as through an Ethernet port or another wired network connection. The network access may also include wireless network access, such as through Wi-Fi or through a cellular connection (such as 4G Long-Term Evolution (LTE) or 5G New Radio (NR)).

In some cases, the security attacks may attempt to gain access to or control of input/output (I/O) devices. Input devices may include devices used to enter information into the business 130, such as a keyboard, mouse (or other pointing device), and so on. However, input devices may also include other sensors that provide information to the business 130. In some embodiments, the input devices may include cameras and microphones, but are not limited to these types of devices, and could other sensors, such light, heat, and moisture sensors, or Internet of Things (IoT) sensors. The security attacks may attempt to intercept information provided into the input sensors (for example, using a keylogger), or may attempt to introduce foreign information into the input devices, as examples. In some cases, the output devices include various devices used to share information with users, and may include a monitor, speakers, and so on. However, the output devices may also include a printer. The security attacks may attempt to take over these devices in malicious ways.

The security attacks may also attempt and report back the results of specific types of attacks on the business 130. For example, the security attacks could attempt to breach the firewall 142. The security attacks may also attempt to avoid antivirus software as well as other countermeasures to avoid malware. The security attacks may also attempt specific types of incursions and observe whether the attacks are successful or not. In some cases, the security attacks may attempt certain types of attacks to see if it is possible to deposit a particular type of payload into the business 130. In some embodiments, the security attacks may see if it is possible to install various types of malware into the business 130. In some cases, the malware installed by the security attacks may be a virus or a trojan. In some embodiments, the malware may be adware. In some cases the malware may be ransomware.

In general, the results of the comprehensive IT audit/payload are organized and presented to a user of the system to help the user assess the risk of specific threats. As discussed above, the comprehensive IT audit shown in FIG. 9 includes portions including detection avoidance measures 560 that allow the attacks to avoid detection based counter-measures, a payload 562 that includes specific tests and attacks that establish particular vulnerabilities of the security measures of a given business 130, a penetrator 564 that allows the payload 562 to successfully attack the given business 130 despite measures such as a firewall 142, and a feedback/output portion 566 that acts as a template for organizing and communicating results of an attack to a user for use in exploiting the IT audit to better understand which aspects of the security of business 130 are resistant to attacks and which aspects of the security of business 130 are vulnerable. As the IT audit identifies the vulnerabilities, a user of the business 130 may use the information to identify corrective steps that need to be made and carry out such corrective steps or the results may block attacks.

Figure 10:
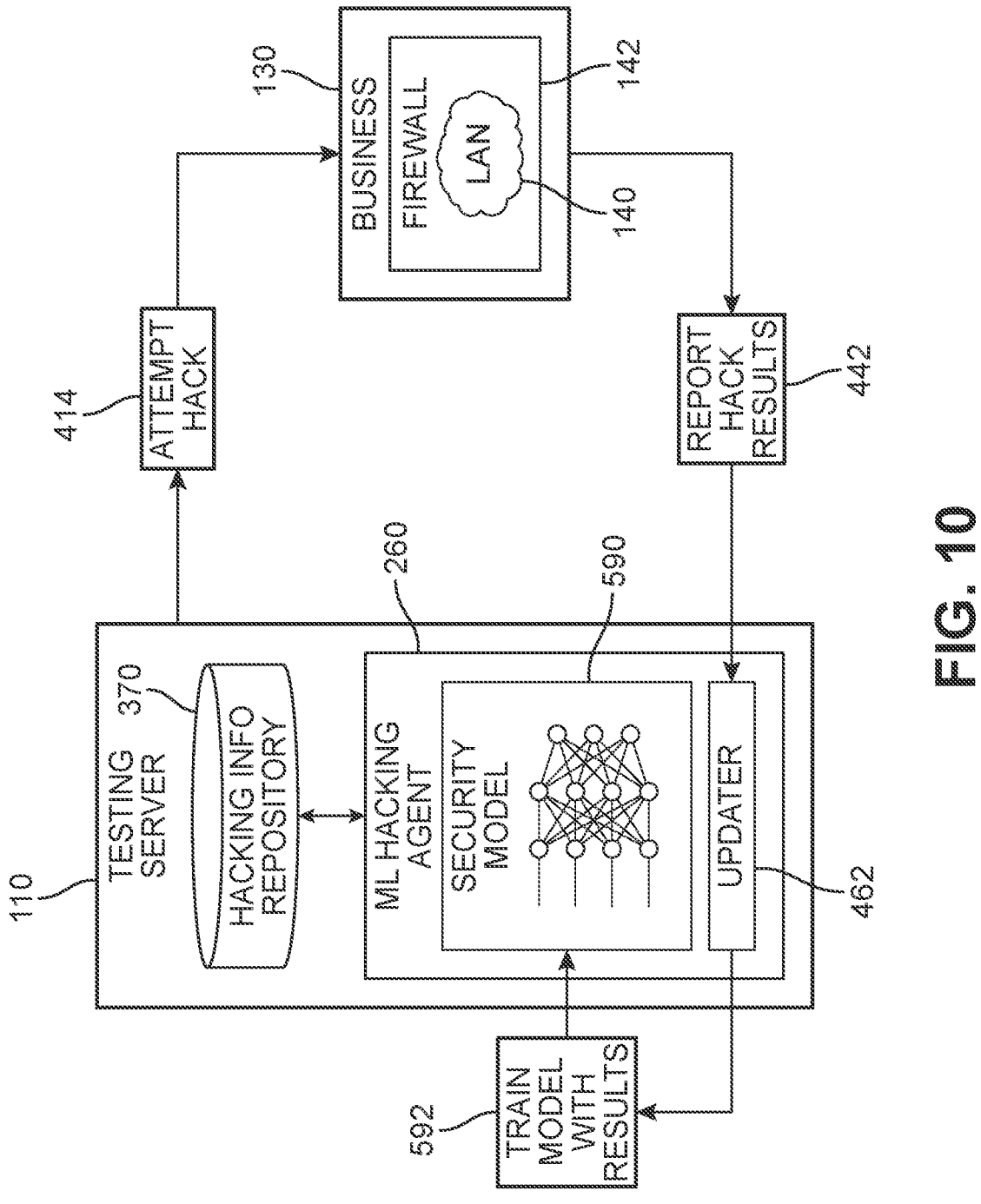
FIG. 10 is a schematic diagram of a testing server that launches test security attacks on a network in a testing system to train a security model in a machine learning (ML) hacking agent, according to an embodiment.

FIG. 10 is a schematic diagram of a testing server that launches test security attacks on a network in a testing system to train a security model in a machine learning (ML) hacking agent, according to an embodiment. FIG. 10 shows direct interaction between testing server 110 and business 130 for purposes of explanation, though these elements may interact through the Internet 120 as shown in FIG. 4. Testing server 110 attempts hacks 414 on business 130 and the LAN 140 and its firewall 142. Business 130 reports hack results 442 to updater 462. FIG. 10 shows in particular that hacking information repository 370 interacts with ML hacking agent 260.

FIG. 10 shows that there is a security model 590, shown as a neural network, such that updater 462 trains security model 590 using the hack results 592. For example, the training may use backpropagation and/or gradient descent.

Figures 11, 12:
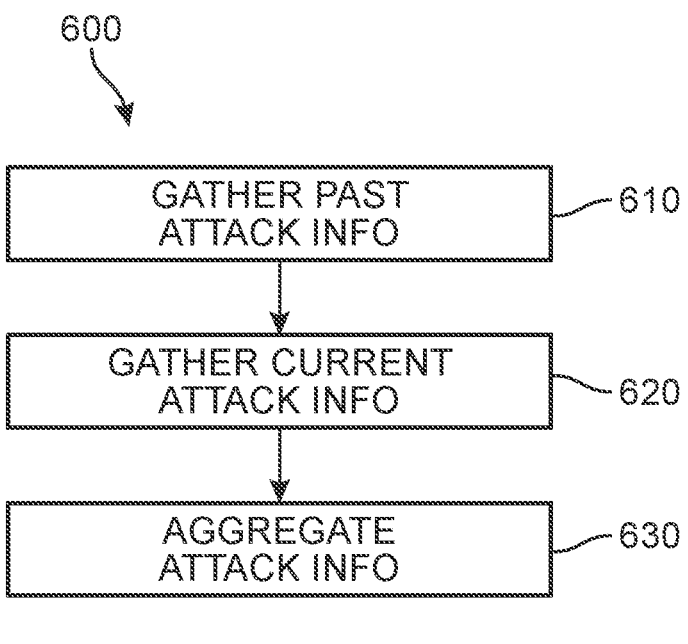
FIG. 11 is a flowchart of a method to prepare information for test attacks by a machine learning (ML) hacking agent, according to an embodiment.
FIG. 12 is a flowchart of a method to further prepare for and carry out test attacks by a machine learning (ML) hacking agent, according to an embodiment.

FIG. 11 is a flowchart of a method 600 to prepare information for test attacks by a machine learning (ML) hacking agent, according to an embodiment.

In operation 610, the method gathers past attack information, such as from past/traditional hacking information repository 502. For example, the security attack planning device 510 performs such gathering. Further, security attack receiving module 512 coordinates selecting gathered security attacks based on request payload 252. Thus, operation 610 gathers information about how to perform known attack techniques, based on information such as request payload 252.

Figure 13:
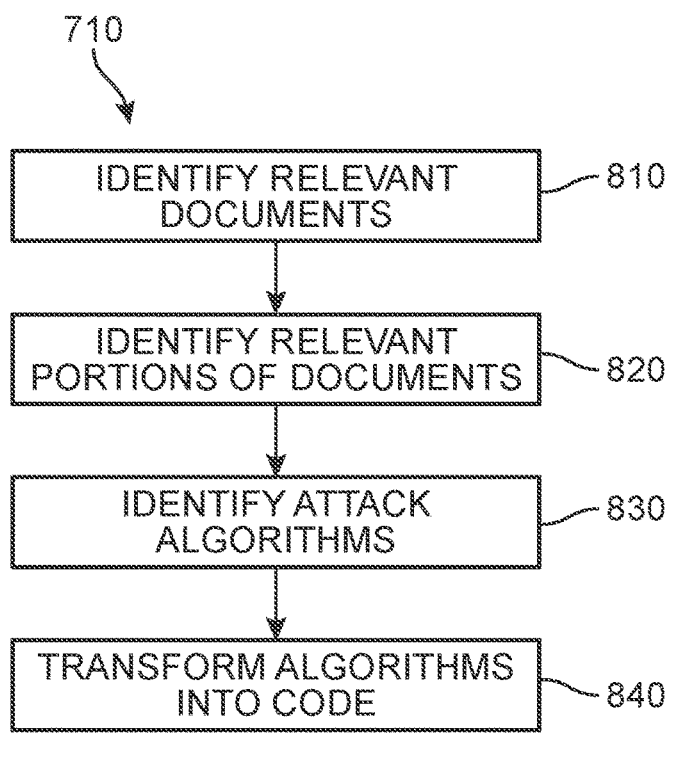
FIG. 13 is a flowchart of a method to use natural language processing (NLP) to identify new attacks from attack information, according to an embodiment.

In operation 620, the method gathers current attack information such as from current/new hacking information repository 504. Such gathering is illustrated in FIG. 3. The current attack information is based on request payload 252, but uses NLP techniques to ascertain particular possible techniques, as shown in FIG. 13.

In operation 630, the method aggregates attack information. Security attack aggregating module 514 may perform the aggregating. In the aggregating, the method establishes information related to pre-existing security attacks and new security attacks. Based on combining this information, the method prepares specific attacks for attempting by method 700, as detailed in FIG. 12.

FIG. 12 is a flowchart of a method 700 to further prepare information for and carry out test attacks by a machine learning (ML) hacking agent, according to an embodiment.

In operation 710, the method processes attack information with natural language processing (NLP). Details of such a method are provided at FIG. 13, which specifies how the NLP uses information to identify actual methods and approaches. The goal of the NLP is to provide code, scripts, algorithms, or the like that can be used in attacks.

In operation 720, the method identifies attacks to attempt. The NLP performed in operation 720 previously processed information obtained over the network to identify specific code that can be used for the attempting of the known algorithms and uses the NLP to identify specific code to attempt the new algorithms. Hence, in operation 720, the attempting method 700 determines which specific attacks to attempt and readies code for the attempts.

In operation 730, the method attempts the attacks identified in operation 720. For example, such attempts are attempted as shown in FIG. 4 at launch hack 412 and attempt hack 414.

FIG. 13 is a flowchart of a method 710 to use natural language processing (NLP) to identify new attacks from attack information, according to an embodiment.

In operation 810, the method identifies relevant documents. For example, such relevant documents may be identified by using search engines and keyword lists as discussed above. The relevant documents may also be identified based on lists of specific websites, which may or may not be hosted on the deep web or the dark web. Such websites may be websites of particular hackers or hacker groups, which would be known to be more relevant as sources of information about novel hacking techniques. However, relevant documents are not limited to websites, and may include other documents including text that may be processed using NLP to identify hacking techniques.

In operation 820, the method identifies relevant portions of the relevant documents. The method may use NLP techniques such as morphological analysis, syntactic analysis, lexical semantics, relational semantics, and discourse semantics along with keywords to identify portions of the relevant documents that may describe attack algorithms. The method is not limited to code analysis. Operation 820 may also identify flowcharts or flow diagrams that may correspond to relevant algorithms.

In operation 830, the method identifies attack algorithms from the relevant portions. For example, in operation 820, the method has found portions of documents by hackers that include a description of a hacking technique. By performing discourse analysis, these portions can be framed as algorithms. Alternatively, hackers may include specific code, scripts, or pseudocode, which may be processed by an engine such as a compiler to construct a particular algorithm. Another way to derive such an algorithm begins with a flowchart or flow diagram found in a document. The derivation then transforms the flowchart or flow diagram into a corresponding algorithm.

In operation 840, the method transforms the algorithms into attack code. The ML hacking agent 260 can then execute the code subsequently. As noted, the ML hacking agent 260 may modify attack code to ensure that the attempts do not permanently damage the target network. For example, the ML hacking agent 260 uses an inert payload. Using an inert payload detects vulnerabilities while avoiding lasting harm.

Figure 14:
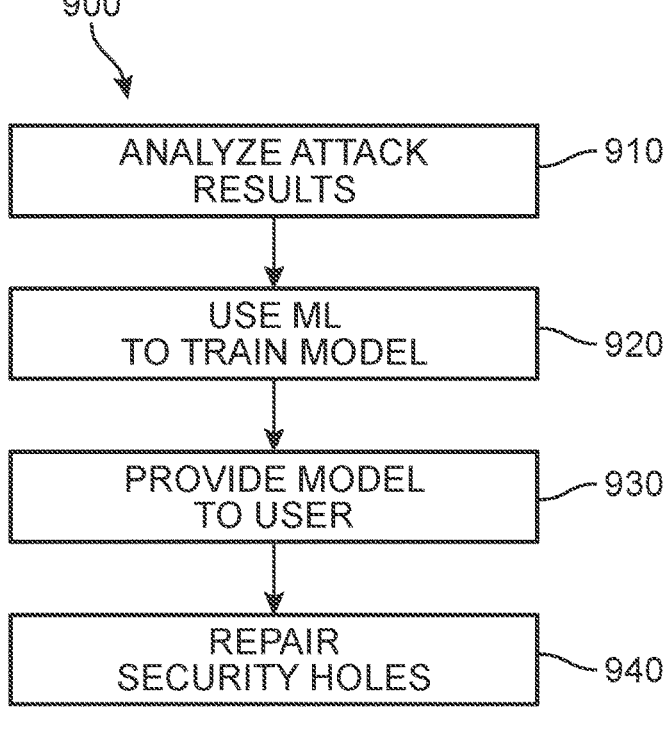
FIG. 14 is a flowchart of a method to analyze and learn from test attacks by a machine learning (ML) hacking agent to provide a model to a user, according to an embodiment.

FIG. 14 is a flowchart of a method 900 to analyze and learn from test attacks by a machine learning (ML) hacking agent to provide a model to a user, according to an embodiment.

In operation 910, the method analyzes attack results. For example, the method ascertains which attacks were successful and which attacks were unsuccessful. The method may also detect more specific information for successful attacks. For example, the method may detect information about how and where a payload was successfully introduced. The method may also detect which access privileges were obtained. The method may further detect which parameters led to successful attacks. For example, a simple brute-force password attack may fail, but using a particular dictionary may result in a successful password attack. The method may also detect information about how unsuccessful attacks are blocked. For example, the method may detect that antivirus software blocked a virus, or that a firewall blocked an unauthorized user.

In operation 920, the method uses machine learning (ML) to train a model. From operation 910, the method has access to information about which attacks are successful and which attacks are unsuccessful, as well as additional data about why the attacks succeed and fail. Accordingly, the model evolves based on the learned data.

In operation 930, the method provides a model to the user. The model is trained, as in operation 920. In operation 930, the method provides the model as a document, or displays the model for the user. The model includes information about successful hacks, unsuccessful hacks, and attributes of the successful/unsuccessful hacks. Having such a model is useful in that it provides reassurance that some kinds of security attacks are adequately protected. The model also helps focus security efforts on parts of a system that are the most vulnerable. In some cases, it is possible to use the model to block a security attack once the model is provided. To do so, the model includes information about security attempts and how they were attempted when it was trained. The model may also include information about countermeasures. Such countermeasures may also be derived using NLP when analyzing the network content or by using information from hacking information repository. Thus, using the model to block the security attack applies the model in a useful manner.

In operation 940, the method repairs security holes. Operation 940 is optional. It may be sufficient simply to report information about the model to a user. Operation 940 may provide steps required for a user to fix a vulnerability. Moreover, the model may recognize vulnerabilities for which automatic fixes are not possible. For example, the model may be able to fix a firewall vulnerability automatically by changing what the firewall vulnerability blocks. However, a vulnerability due to an easily guessed password may require a password change along with user education. It is possible that the machine learning (ML) hacking agent will find information about how to repair a hack along with information about a new hack. For example, a web page that describes a new Trojan may also include information about how to block said Trojan.

The trained security model itself has immediate value because it allows the ML hacking agent to substitute for a human white hat hacker who could otherwise be quite costly and slow. Another way to use examples is to identify security holes, attempt to patch the holes or otherwise minimize risk, and then re-test to establish whether the patching was successful. The trained security model is also able to constantly integrate the most current hacks into its testing. In addition to trying out existing/traditional hacks, the natural language processing (NLP) of documents allows the ML hacking agent to immediately incorporate the latest hacks, including those of grey hat/black hat hackers, increasing the ability of the ML Hacker to thoroughly test the network security.

For example, an ML hacking agent may suggest particular security measures. For example, security measures may include access control, anti-keyloggers, anti-malware, anti-spyware, anti-subversion software, anti-tamper software, anti-theft measures, antivirus software, cryptographic software, computer-aided dispatch, firewalls, intrusion detection systems, intrusion prevention systems, log management software, parental control software, records management, sandbox environments, security information management, security information and event management, software and operating system updating, and vulnerability management.

As the network implements the security measures, its security improves. However, the ML hacking agent can continually identify new threats and help ascertain how to manage these threats.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of protecting a network from a security attack using a security model that includes machine learning, the method being encoded on non-transitory computer-readable media, the method comprising:

accessing information about security attacks from at least one security attack information source, the at least one security attack information source being a set of content retrievable through an internet search engine;

recognizing types of security attacks being attempted using natural language processing to process the information about the security attacks;

training the security model based on the natural language processing of the information about security attacks from the set of content retrievable through the internet search engine by transforming the recognized types of security attacks being attempted from the information about security attacks in the set of content retrievable through the internet search engine into attack code that is executable by the security model, the attack code including computer readable instructions for the security model to engage in at least one test attack on a network;

attempting at least one of the recognized types of security attacks on hardware associated with the network, including at least one of a processor, memory, and storage, by executing the attack code to engage in at least one test attack on the network;

identifying at least one security vulnerability based on results of the attempting;

training the security model based on the identified at least one security vulnerability using machine learning by repeating the steps of accessing, recognizing, training, attempting, and identifying for a plurality of different types of security attacks;

providing the trained security model to a user of the network; and blocking a security attack on the network using the trained security model.

2. The method of claim 1, wherein the information about security attacks comprises information about at least one of current security attacks and historical security attacks.

3. The method of claim 1, wherein the information about security attacks comprises information about new security attacks.

4. The method of claim 1, wherein the information about security attacks comprises at least one of: documents obtained with a search engine using a list of keywords related to security attacks; web pages, and documents obtained from a darknet.

5. The method of claim 4, wherein the recognizing comprises using the natural language processing to process the documents to identify an algorithm used for a security attack.

6. The method of claim 1, wherein the method is performed by a server that includes a security attack planning device, a security attack trial device, and a security attack learning device.

7. The method of claim 1, wherein the security model modifies the attack code prior to executing the attack code, to ensure that the attempted security attack using the attack code does not permanently damage the network.

8. A system for protecting a network from a security attack using a security model that includes training the security model in a testing system using machine learning, comprising:

at least one processor configured to access non-transitory computer-readable media that includes instructions to:

access information about security attacks from at least one security attack information source, the at least one security attack information source being a set of content retrievable through an internet search engine;

recognize types of security attacks being attempted using natural language processing to process the information about the security attacks;

train the security model based on the natural language processing of the information about security attacks from the set of content retrievable through the internet search engine by transforming the recognized types of security attacks being attempted from the information about security attacks in the set of content retrievable through the internet search engine into attack code that is executable by the security model, the attack code including computer readable instruction for the security model to engage in at least one test attack on a network;

attempt at least one of the recognized types of security attacks on hardware associated with the network, including at least one of a processor, memory, and storage, by executing the attack code to engage in at least one test attack on the network;

identify at least one security vulnerability based on results of the attempting;

train the security model based on the identified at least one security vulnerability using machine learning by repeating the steps of accessing, recognizing, training, attempting, and identifying for a plurality of different types of security attacks;

provide the trained security model to a user of the network; and block a security attack on the network using the trained security model.

9. The system of claim 8, wherein the information about security attacks comprises information about at least one of current security attacks and historical security attacks.

10. The system of claim 8, wherein the information about security attacks comprises information about new security attacks.

11. The system of claim 8, wherein the information about security attacks comprises at least one of: documents obtained with a search engine using a list of keywords related to security attacks; web pages, and documents obtained from a darknet.

12. The system of claim 11, wherein the recognizing comprises using the natural language processing to process the documents to identify an algorithm used for a security attack.

13. The system of claim 8, wherein the method is performed by a server that includes a security attack planning device, a security attack trial device, and a security attack learning device.

14. The system of claim 8, wherein the security model modifies the attack code prior to executing the attack code, to ensure that the attempted security attack using the attack code does not permanently damage the network.

15. A computer-implemented method of improving the security of a network using a security model that includes machine learning, the method being encoded on non-transitory computer-readable media, the method comprising:

accessing information about security attacks from at least one security attack information source, the at least one security attack information source being a set of content retrievable through an internet search engine;

recognizing types of security attacks being attempted using natural language processing to process the information about the security attacks;

training the security model based on the natural language processing of the information about security attacks from the set of content retrievable through the internet search engine by transforming the recognized types of security attacks being attempted from the information about security attacks in the set of content retrievable through the internet search engine into attack code that is executable by the security model, the attack code including computer readable instructions for the security model to engage in at least one attack on a network;

attempting at least one of the recognized types of security attacks on hardware associated with the network, including at least one of a processor, memory, and storage, by executing the attack code to engage in at least one test attack on the network;

identifying at least one security vulnerability based on results of the attempting;

training the security model based on the identified at least one security vulnerability using machine learning by repeating the steps of accessing, recognizing, training, attempting, and identifying for a plurality of different types of security attacks; and providing instructions to repair the at least one security vulnerability for the network using the security model.

16. The method of claim 15, wherein the information about security attacks comprises information about at least one of current security attacks and historical security attacks.

17. The method of claim 15, wherein the information about security attacks comprises information about new security attacks.

18. The method of claim 15, wherein the information about security attacks comprises at least one of: documents obtained with a search engine using a list of keywords related to security attacks; web pages, and documents obtained from a darknet.

19. The method of claim 18, wherein the recognizing comprises using the natural language processing to process the documents to identify an algorithm used for a security attack.

20. The method of claim 15, wherein the method is performed by a server that includes a security attack planning device, a security attack trial device, and a security attack learning device; and the security model modifies the attack code prior to executing the attack code, to ensure that the attempted security attack using the attack code does not permanently damage the network.

* * * * *